United States Patent [19]

McGee

[11] Patent Number: 6,084,029
[45] Date of Patent: Jul. 4, 2000

[54] HIGH TEMPERATURE POLYOLEFIN BASED ADHESIVE FILM WITH IMPROVED POLARITY FOR ADHERING TO POLYURETHANE FOAMS

[75] Inventor: Robert Lee McGee, Midland, Mich.

[73] Assignee: The Dow Chemical Company, Midland, Mich.

[21] Appl. No.: 09/353,870

[22] Filed: Jul. 15, 1999

Related U.S. Application Data

[63] Continuation of application No. 09/126,130, Jul. 30, 1998.

[51] Int. Cl.⁷ .................................................... C08G 63/48
[52] U.S. Cl. .............................. 525/66; 525/64; 525/179; 156/330.9; 156/331.6; 156/331.8
[58] Field of Search ......................................... 525/66, 64

[56] References Cited

U.S. PATENT DOCUMENTS

| | | | |
|---|---|---|---|
| 4,592,960 | 6/1986 | Inoue et al. | 428/461 |
| 4,612,155 | 9/1986 | Wong et al. | 264/176 R |
| 5,506,298 | 4/1996 | Paul et al. | 525/66 |
| 5,637,410 | 6/1997 | Bonner et al. | 428/516 |

OTHER PUBLICATIONS

S. Wu, *Polymer Interface and Adhesion*, Marcel Dekker Inc., New York and Basel, (1992), pp. 178–181.

*Primary Examiner*—Ana Woodward

[57] ABSTRACT

Adhesion promoters, adhesive compositions, and adhesive films that adhere well to polar materials contain the product of a reaction between a polyolefin grafted with an ethylenically unsaturated carboxylic acid and/or an ethylenically unsaturated carboxylic acid anhydride, and a polymeric and/or oligomeric polyamine. The reaction product may be blended with an ethylene polymer, such as a low density polyethylene, to form an adhesive composition that bonds well to polar substrates, such as polyurethane foam. The adhesive compositions may be extruded or cast to form adhesive films.

7 Claims, No Drawings

HIGH TEMPERATURE POLYOLEFIN BASED ADHESIVE FILM WITH IMPROVED POLARITY FOR ADHERING TO POLYURETHANE FOAMS

This application is a Continuation of prior application No. 09/126,130 filed Jul. 30, 1998.

FIELD OF THE INVENTION

This invention relates to adhesive films, and more particularly to adhesive films that are formulated to adhere better to polar materials.

BACKGROUND OF THE INVENTION

Ethylene acrylic acid (EAA) copolymers and maleic anhydride (MAH) modified polymers are known to adhere well with polar materials. However, adhesive films prepared with high amounts of EAA copolymers or MAH polymers tend to be too expensive for routine use in many applications, such as in the production of automotive parts like headliners. In an attempt to provide lower cost adhesive films that exhibit good adhesive properties with polar materials, others have blended polymers exhibiting good adhesion to polar materials with less expensive olefin polymers. However, these blends still tend to be too expensive for many applications, or to exhibit unacceptable adhesion to polar materials or both.

It is also known to incorporate a catalytic amount of an acidic agent or a basic agent into an adhesive composition that contains a grafted polyolefin in order to enhance adhesion. The catalytic agent is selected from monoalkyl phosphates, dialkyl phosphates, monoalkylamines, dialkylamines, trialkylamines, heterocyclic amino compounds, aminocarboxylic acids and salts of such acids. Examples of amines include tributylamine and trioctylamine. A disadvantage in using these amines, both of relatively low molecular weight, as catalytic agents is that they tend to volatilize, especially at temperatures needed to melt blend the catalytic agents with EAA copolymers, MAH-modified polymers or both. Volatilization of the amine catalytic agents may present health, safety and environmental issues, all of which are desirably avoided.

It is also known in the art to react primary amino- or hydrazide-substituted ultraviolet (UV) absorbers with some or all of the anhydride groups of anhydride containing polymers or copolymers to form pendant stabilizer substituted iinide or amic acid groups. An amic acid results from a reaction between an anhydride and an amine wherein the amine attacks one anhydride carbonyl group to produce an amide while leaving a second carbonyl group unreacted as a carboxylic acid. The resulting polymeric stabilizers may be used as is or as concentrates to stabilize other polymer systems. Polymeric or polymer bound stabilizers are not lost from a polymer system by volatilization, migration, or extraction, even at high temperatures. Although the polymeric stabilizers themselves are not subject to volatilization, they are prepared from a primary amino-substituted 2-hydroxybenzophenone, a primary amino-substituted salicylic acid ester or primary amino-substituted oxalic acid amide, all of which are low molecular weight molecules that could volatilize when melt blended with anhydride-containing polymers or copolymers. The polymeric stabilizers prepared by reacting primary amino compounds with anhydride containing polymers or copolymers are not known to be used as adhesives or adhesion promoters.

SUMMARY OF THE INVENTION

A first aspect of this invention is an adhesion promoter or adhesive that is a product of a reaction between a first reactant that is a polyolefin grafted with a graftable monomer that is an ethylenically unsaturated carboxylic acid, an ethylenically unsaturated carboxylic acid anhydride or both and a second reactant that is a polymeric polyamine, an oligomeric polyamine or both.

A second, but related aspect of the invention is an adhesive composition that comprises from 50% to 80% by weight (wt %) of an ethylene polymer that is substantially free of graft modification and from 20 to 50 wt % of the adhesion promoter or adhesive of the first aspect. The adhesive composition has sufficient polarity to allow it to effectively bond to polar materials, such as polyurethane foam.

A third, also related aspect of the invention is an adhesive film prepared from the adhesive composition of the second aspect.

The invention also relates to methods for preparing adhesives, adhesive compositions and films by using the adhesion promoter of the first aspect or by reacting it with another component.

The invention further relates to a method of adhering a first substrate to a second substrate, the method comprising a first step of applying the adhesive composition of the first aspect to a surface of at least one of the substrates and a step of bringing at least one surface of each substrate together in such a manner as to dispose the adhesive composition at an interface between such surfaces.

DESCRIPTION OF THE PREFERRED EMBODIMENTS

The adhesive or adhesion promoter is the product of a reaction between two components. A first component is a polyolefin that is grafted with an ethylenically unsaturated carboxylic acid, an ethylenically unsaturated carboxylic acid anhydride or both. A second component is polymeric polyamine, an oligomeric polyamine or both. The grafted polyolefin may be formed by grafting an ethylenically unsaturated monomer onto a polyolefin using known methods such as that described in U.S. Pat. No. 4,612,155.

Polyolefins suitable for use as base polymers for grafting include ethylene homopolymers and copolymers of ethylene and an alpha-olefin (α-olefn). A preferred grafted polyolefin, on account of its relatively low cost and commercial availability, as well as excellent performance in the adhesive compositions and films of this invention, is a MAH-modified linear low density polyethylene (MAH-g-LLDPE). A suitable, commercially available MAH-g-LLDPE is sold under the name Bynel™4104 by E. I. du Pont de Nemours and Company. Other polyolefins that may be grafted include copolymers of ethylene and a vinyl alkanoate, such as ethylene/vinyl acetate (EVA) copolymers; ethylene/alkyl (meth)acrylate copolymers including ethylene/methacrylate copolymers, ethylene/methyl acrylate (EMA) copolymers, ethylene/butyl acrylate (EBA) copolymers and ethylene/methylmethacrylate (EMMA) copolymers); ethylene/carbon monoxide (ECO) copolymers; ethylene/vinyl alkanoate/carbon monoxide terpolymers, such as ethylene/vinyl acetate/carbon monoxide (EVACO) terpolymers; and ethylene/alkyl(meth)acrylate/carbon monoxide terpolymers, such as ethylene/butyl acrylate/carbon monoxide (EBACO) terpolymers. Such copolymers are known in the art and many are commercially available.

The monomer grafted onto the polyolefin is at least one ethylenically unsaturated monomer selected from ethylenically unsaturated carboxylic acids and ethylenically unsaturated carboxylic acid anhydrides. Examples of such acids and anhydrides include mono-, di- or polycarboxylic acids such as acrylic acid, methacrylic acid, maleic acid, fumaric acid, itaconic acid, crotonic acid, itaconic anhydride, Nadic Methyl Anhydride™ (methyl-bicyclo[2.2.1]heptene-2,3-dicarboxylic anhydride isomers, allied chemical corporation), MAH and substituted MAH materials, such as dimethyl MAH.

Suitable polymeric and oligomeric polyamines include dimers, trimers and tetramers (known collectively as oligomers), and polymers (macromolecules comprised of five or more monomers). The polymeric and oligomeric polyamines include at least two amine groups per molecule. The polyamines used for preparing the adhesive films of this invention preferably contain from 20 to 100 wt % amine-containing monomer, more preferably at least 50 wt % amine-containing monomer, based on polyamine weight. The polymeric and oligomeric polyamines employed in the practice of this invention preferably have a weight average molecular weight ($M_w$) of at least 250 daltons, more preferably at least 500 daltons, and most preferably at least 1,000 daltons.

A suitable polymeric polyamine is a copolymer of N,N'-bis(2,2,6,6)-tetramethyl-4-piperidinyl-1,6-hexadiamine with 2,4-dichloro-6-(4-morpholinyl)-1,3,5-triazine (a hindered amine type UV stabilizer commercially available under the trade designation Cyasorb® UV-3346 from Cytec Industries). Any utility of such a polyamine as a UV stabilizer in compositions of the present invention is merely incidental, as it is primarily, if not solely, used to enhance adhesion of the grafted polyolefins, and polymer blends containing such grafted polyolefins.

Polymeric and oligomeric polyamines can be prepared, for example, by solution polymerization, in aqueous media, of at least one ethylenically unsaturated monomer that includes an amine group, either with or without an ethylenically unsaturated comonomer that does not contain an amine group. Monomers that contain an amine group include aminoalkyl vinyl ethers or sulfides wherein alkyl groups are straight-chains or branched-chains and the nitrogen atom is a primary, secondary, or tertiary nitrogen atom. Specific examples including beta (β)-aminoethyl vinyl ether, β-aminoethyl vinyl sulfide, N-monomethyl-β-aminoethyl vinyl ether or sulfide, N-monoethyl-β-aminoethyl vinyl ether or sulfide, N-monobutyl-β-aminoethyl vinyl ether or sulfide, and N-monoethyl-3-aminopropyl vinyl ether or sulfide. Other suitable monomers containing an amine group include acrylamides and aminoalkyl(methyl)acrylates, such as dimethylaminoethylacrylate or methacrylate, β-aminoethyl acrylate or methacrylate, N-β-aminoethyl acrylamide or methacrylamide, N-(monomethylaminoethyl)-acrylamide or methacrylamide, N-(mono-n-butyl)-4-aminobutyl acrylate or methacrylate, methacryloxyethoxyethylamine, and acryloxypropoxypropylamine. Monomers that contain an amine group also include N-acryloxyalkyl-oxazolidines and N-acryloxyalkyltetrahydro-1,3-oxazines and corresponding components in which the alkyl linkage is replaced by an alkoxyalkyl or a poly(alkoxy-alkyl). Examples include oxazolidinylethyl methacrylate, oxazolidinylethyl acrylate, 3-(gamma-methacryl-oxypropyl)-tetrahydro-1,3-oxazine, 3-(β-methacryloxyethyl)-2,2-penta-methylene-oxazolidine, 3-(β-methacryloxyethyl-2-methyl-2-propyloxazolidine, N-2-(2-acryloxyethoxy)ethyl-oxazolidine, N-2-(2-methacryloxyethoxy)ethyloxazolidine, N-2-(2-methacryloxyethoxy)ethyl-5-methyl-oxazolidine, N-2-(2-acryloxyethoxy)ethyl-5-methyl-oxazolidine, 3-[2-(2-methacryloxyethoxy) ethyl)]-2,2-penta-methylene-oxazolidine, 3-[2-(2-methacryloxyethoxy)ethyl)]-2,2-dimethyloxazolidine, 3-[2(methacryloxyethoxy)ethyl]-2-phenyl-oxazolidine. Monomers that readily generate amines by hydrolysis are also useful. Examples of such monomers include acryloxy-ketimines and acryloxy-aldimines, with illustrative compounds including 2-[4-(2,6-dimethylheptylidene)-amino]-ethyl methacrylate, 3-[2-(4-methylpentylidine)-amino]-propyl methacrylate, β-)benzylideneamino)-ethyl methacrylate, 3-[2-(4-methylpentylidene)-amino]-ethyl methacrylate, 2-[4-(2,6-dimethylheptylidene)-amino]-ethyl acrylate, 12-(cyclopentylidene-amino)-dodecyl methacrylate, N-(1,3-dimethylbutylidene)-2(2-methacryloxyethoxy)-ethylamine, N-(benzylidene)-methacryloxyethoxyethylamine, N-(1,3-dimethylbutylidene)-2-(2-acryloxyethoxy)-ethylamine, N-(benzylidene)-2-(2-acryloxyethoxy)ethylamine.

Polymeric and oligomeric polyamines can be prepared by polymerizing any of the ethylenically unsaturated amine-containing monomers set forth above, either by themselves, with each other, or with an ethylenically unsaturated comonomer that lacks an amine group. Examples of amine-free comonomers include alkyl acrylates (esters of acrylic acid with an alcohol containing 1 to 18 carbon atoms ($C_{1-18}$), especially $C_{1-4}$ alcohols or alkanols), styrene, vinyl toluene, vinyl acetate, vinyl chloride, vinylidene chloride, substituted styrenes, butadiene, substituted butadienes, ethylene, and the nitriles and amides of acrylic and methacrylic acid.

The grafted polyolefins used in preparing adhesives and adhesion promoters need not have a particular carboxylic acid or carboxylic acid anhydride content. The grafted polyolefin preferably contains a total amount of 0.001% to 5 wt %, based on grafted polyolefin weight, of carboxylic acid groups, carboxylic acid anhydride groups or both. Amounts below 0.001 wt % lack desired adhesive properties. Amounts greater than 5 wt % provide no significant additional benefits and amounts substantially in excess of 5 wt % may actually detract from adhesive properties.

The polymeric polyamines, oligomeric polyamines or both are present in an amount that depends upon both desired properties and amine group-containing monomer content of such polyamines. The amount and type of polyamine preferably provide an excess of ethylenically unsaturated carboxylic acid groups, ethylenically unsaturated carboxylic acid anhydride groups or both. Generally, the amount and type are selected to yield a ratio of carboxylic acid groups, carboxylic acid anhydride groups or both to amine groups of from 10:1 to 3:2, preferably from 3:1 to 2:1.

The adhesive or adhesion promoter has a weight ratio of grafted polyolefin to polyamine of from 20:1 to 400:1. The adhesive or adhesion promoter may be used alone or, more preferably, it may be combined with an ethylene polymer that has not been graft modified to form an adhesive composition suitable for use in making an adhesive film.

In a preferred aspect of this invention, adhesive compositions comprise polymeric blends of from 50 wt % to 80 wt % of an ethylene polymer that has not been graft modified, and from 20 wt % to 50 wt % of the adhesive or adhesion promoter disclosed above, the amounts being based upon composition weight and totaling 100 wt %. The adhesive compositions can be prepared by combining an ethylene polymer that has not been graft modified and the adhesion promoter in a conventional melt blending apparatus such as in an extruder. An alternate procedure combines the unmodified ethylene elastomer with those components that, when reacted, form the adhesive or adhesion promoter in such an apparatus. Irrespective of the procedure, the blends typically have a polyamine content of from 0.1 to 1 wt %, based upon total blend weight.

"Ethylene polymer", as used herein, refers to ethylene homopolymers and copolymers of ethylene and at least one other ethylenically unsaturated monomer. Examples of ethylene copolymers include copolymers of ethylene and at least one higher (from 3 to 20 carbon atoms ($C_{3-20}$), preferably $C_{3-8}$) α-olefin monomer such as propylene, butene-1, hexene-1 and octene-1; copolymers of ethylene and a vinyl alkanoate such as EVA copolymers and/or copolymers of ethylene and alkyl (meth)acrylate. Preferred ethylene polymers, on account of their relatively low cost, commercial availability, and satisfactory performance in the adhesive compositions and films of this invention, are low density polyethylenes (LDPE). A particularly suitable, commercially available LDPE is LDPE 620I (The Dow Chemical Company). Other suitable ethylene polymers include those identified above as suitable base polymers for grafting.

The adhesive compositions of this invention may, and preferably do, contain a silicon dioxide ($SiO_2$) antiblock concentrate. A suitable $SiO_2$ antiblock concentrate is CN 734 (Southwest Plastics, Houston Texas). The antiblock concentrate may be used in an amount up to 7.5 wt %, based on adhesive composition weight. Other additives, such as colorants, antioxidants and UV stabilizers, may be added in minor amounts as desired.

The adhesive compositions described above may be cast or extruded through a die to form adhesive films that exhibit enhanced polarity as determined by contact angle measurements using a Tantec™ contact angle meter model CAM-FILM, and improved adhesion with polar substrates as determined by measuring peel strength of adhesive films bonded to polyurethane foam.

The adhesive compositions of this invention exhibit improved (relative to adhesive films made from resin blends of EAA and LLDPE) adhesion to polar substrates and can be advantageously used to adhere or bond a first substrate to a second substrate, especially when at least one of the substrates has a polar surface. The adhesive compositions of this invention are especially useful for adhering a polyurethane material to another material, which may or may not also be a polar material, and which may or may not be polyurethane. An illustration of the latter involves bonding a polyurethane foam layer to another layer of an automobile interior panel, such as an automobile headliner. The adhesive composition is preferably applied to a substrate surface as a preformed film.

The following example illustrates certain aspects of the invention and does not limit the scope of the invention described in the specification and claims.

EXAMPLE

Prepare a dry blend of polymer resin pellets containing 70 wt % LDPE (LDPE 620I, The Dow Chemical Company), 20 wt % MAH-g-LLDPE (BYNEL® 4104, E. I. du Pont de Nemours and Company), 5 wt % of an antiblock concentrate (CN-734, Southwest Plastics) that consists of 85 wt % LDPE and 15 wt % $SiO_2$, and 5 wt % of an additive concentrate (CN-720, Southwest Plastics) that consists of 87 wt % LDPE, 10 wt % of an oligomeric hindered amine that sometimes serves as a UV stabilizer (CYRASORB® 3346 ), 2 wt % of a pliosphite antioxidant (MARK® 2112) and 1 wt % of a hindered phenolic antioxidant (CYANOX® 1790). The dry blend percentages are based on blend weight and concentrate percentages on concentrate weight. In each instance, the percentages total 100 wt %.

Extrude the dry blend into a round profile that has a diameter of 0.21 inches (in) (0.53 centimeters (cm)) using a 2 inch (5.1 cm) single screw extruder. Operate the extruder at a rate of 20 revolutions per minute (rpm) using the following temperature profile: Barrel Zone (BZ) 1–332° Fahrenheit (°F.) (166.7° Centigrade (°C.)), BZ2–346° F. (174.4° C.), BZ3–366° F. (185.5° C.), Zone 4 (gate) –370° F. (187.8° C.), Gate/adapter –371° F. (188.3° C.), and Transfer line –371° F. (188.3° C.). This profile results in an extrudate melt temperature of 381° F. (193.9° C.) and a barrel pressure of 2690 pounds per square inch (psi) (18.5 megapascals (Mpa)).

Press the extrudate between polyethylene terephthalate (PET) (Mylar®, E. I. du Pont de Nemours and Company) films at a temperature of 340° F. (171.1° C.), using an applied pressure of 15,000 pounds (lbs) (6804 kilograms (kg)), for 2 minutes and then cool the extrudate while maintaining the applied pressure for 2 minutes. Press additional films as identified in the table shown below under the same conditions. Remove the pressed extrudate films from the PET films and test them for contact angle of water on a pressed extrudate film surface using a goniometer. See, S. Wu, *Polymer Interface and Adhesion*, Marcel Dekker, Inc., New York and Basel, (1992) pp. 178–181 for surface tension calculations and methodology.

Make contact angle measurements at room temperature using deionized water bubbles at bubble apex with a Tantec contact angle meter model CAM-FILM. The results shown in the following table represent an average of three measurements.

| FILM | CONTACT ANGLE |
| --- | --- |
| 620I LDPE | 82.7° ± 4.2° |
| Bynel ® 4104 | 60.0° ± 0° |
| CN-734 | 78.0° ± 2.0° |
| CN-720 | 50.0° ± 10.0° |
| Composition of the Invention | 65.3° ± 1.2° |

The above results show that an adhesive film prepared from an adhesive composition in accordance with this invention, containing a relatively high amount (70 wt %) of non-wettable LDPE and relatively low amounts of polar materials (Bynel® 4104 and CN-720), is very polar.

By way of contrast, contact angle measurements of a film that lacks a polyamine (additive concentrate CN-720) average 82.7°±2.52°. Corona discharge treatment of one side of the film to 42 dynes/centimeter reduces the contact angle to 72.0°±0.0°. The film composition is 64 wt % LDPE, 30 wt % MAH-g-LLDPE and 6 wt % antiblock concentrate (CN-734), all percentages based on composition weight and totaling 100 wt %.

The foregoing results demonstrate that the presence of an oligomeric polyamine (contained in the additive concentrate CN-720) provides a significant reduction in contact angle. This equates to a significant increase in polarity relative to films that lack an oligomeric polyamine, a polymeric polyamine or both. The results show that inclusion of a polyamine provides a greater reduction in contact angle than that resulting from a corona discharge treatment.

Conduct adhesion tests by bonding rigid polyurethane foam to flexible polyurethane foam backed fabric with a pressed extrudate film prepared as detailed above using a Sentinel heat sealing bar set to 280° F. (137.8° C.) and an applied force of 30 psi (206.8 kilopascals (Kpa)) for 20 seconds. Cut test strips (1 inch or 2.5 cm wide) from the bonded foams and peel the foams apart using an Instron tensile testing machine. The following table contains numerical values that represent an average of values from five test samples.

| | |
|---|---|
| Maximum Load | 2.13 lb ± 0.27 lb (0.97 ± 0.12 kg) |
| Average Load Between Limits | 1.76 lb ± 0.23 lb (0.80 ± 0.10 kg) |
| Failure Mode | Cohesive |

The above results demonstrate that the adhesive films of this invention exhibit excellent adhesion to polar substrates such as polyurethane foams, with the failure mode being cohesive, not adhesive.

It will be apparent to those skilled in the art that various modifications to the preferred embodiment of the invention as described herein can be made without departing from the spirit or scope of the invention as defined by the appended claims.

What is claimed is:

1. An adhesive composition consisting essentially of a product of a reaction between a first reactant that is a polyolefin grafted with a graftable monomer that is an ethylenically unsaturated carboxylic acid, an ethylenically unsaturated carboxylic acid anhydride or both, the polyolefin being selected from ethylene homopolymers, copolymers of ethylene and an alpha-olefin (α-olefin), linear low density polyethylene, copolymers of ethylene and a vinyl alkanoate, ethylene/alkyl acrylate copolymers, ethylene/alkyl methacrylate copolymers, ethylene/carbon monoxide copolymers, ethylene/vinyl alkanoate/carbon monoxide terpolymers, ethylene/alkyl acrylate/carbon monoxide terpolymers, ethylene/alkyl methacrylate/carbon monoxide terpolymers, and a second reactant that is a polyamine, the polyamine being a copolymer of N,N'-bis(2,2,6,6)-tetramethyl-4-piperidinyl-1,6-hexadiamine with 2,4-dichloro-6-(4-morpholinyl)-1,35-triazine.

2. The adhesive of claim 1, wherein the first reactant is a maleic anhydride modified linear low density polyethylene.

3. The adhesion promoter of claim 1, wherein the polyolefin of the first reactant is selected from the group consisting of copolymers of ethylene and a vinyl alkanoate, ethylene/alkyl(meth)acrylate copolymers, ethylene/carbon monoxide copolymers, ethylene/vinyl alkanoatelcarbon monoxide terpolymers, and ethylene/alkyl(meth)acrylate/carbon monoxide terpolymers.

4. The adhesive of claim 1, wherein the graftable monomer is selected from the group consisting of acrylic acid, methacrylic acid, maleic acid, fumaric acid, itaconic acid, crotonic acid, itaconic anhydride, (methyl-bicyclo[2.2.1]heptene-2,3-dicarboxylic anhydride isomers, and maleic anhydride.

5. The adhesive of claim 1, wherein the polyamine has a molecular weight of at least 250 daltons.

6. The adhesive of claim 1, wherein the first reactant has a graftable monomer content of from 0.001% to 5% by weight, based on first reactant weight.

7. The adhesive of claim 1, wherein the reactants are present in amounts that provide a ratio of graftable monomer to amine groups of from 10:1 to 3:2.

* * * * *